US010544349B2

(12) United States Patent
Muthusamy et al.

(10) Patent No.: US 10,544,349 B2
(45) Date of Patent: Jan. 28, 2020

(54) CEMENT WITH RESILIENT LATEX POLYMER

(71) Applicant: Halliburton Energy Services, Inc., Houston, TX (US)

(72) Inventors: Ramesh Muthusamy, Pune (IN); Remitha Anandoth Koyitti, Pune (IN); Abhimanyu Pramod Deshpande, Pune (IN); Sohini Bose, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/031,924

(22) PCT Filed: Nov. 25, 2013

(86) PCT No.: PCT/US2013/071627
§ 371 (c)(1),
(2) Date: Apr. 25, 2016

(87) PCT Pub. No.: WO2015/076836
PCT Pub. Date: May 28, 2015

(65) Prior Publication Data
US 2016/0264841 A1 Sep. 15, 2016

(51) Int. Cl.
C09K 8/487 (2006.01)
C04B 24/26 (2006.01)
(Continued)

(52) U.S. Cl.
CPC .......... C09K 8/487 (2013.01); C04B 24/2688 (2013.01); C04B 28/04 (2013.01);
(Continued)

(58) Field of Classification Search
CPC ...... C09K 8/487; C04B 24/2688; E21B 33/14
(Continued)

(56) References Cited

U.S. PATENT DOCUMENTS 4,569,694 A 2/1986 Spitz et al.
6,165,262 A * 12/2000 Kono .................. C04B 24/2641
106/724

(Continued)

FOREIGN PATENT DOCUMENTS

CN 100500794 C * 6/2009 ............... C09K 8/46
EP 0930279 A1 7/1999
(Continued)

OTHER PUBLICATIONS

International Preliminary Report on Patentability issued in related Application No. PCT/US2013/071627, dated Jun. 9, 2016 (11 pages).

(Continued)

Primary Examiner — William D Hutton, Jr.
Assistant Examiner — Ashish K Varma
(74) Attorney, Agent, or Firm — Thomas Rooney; Baker Botts L.L.P.

(57) ABSTRACT

Compositions comprising: (i) a hydraulic cement; and (ii) a polymer comprising at least one monomer having an oxazoline group. Methods of cementing in a well comprising: (A) forming a hydraulic cement composition comprising: (i) a hydraulic cement; (ii) a polymer comprising at least one monomer having an oxazoline group; and (iii) water; (B) introducing the hydraulic cement composition into the well.

15 Claims, 8 Drawing Sheets

(51) Int. Cl.
*C04B 28/04* (2006.01)
*E21B 33/14* (2006.01)
*C04B 103/46* (2006.01)
*E21B 33/138* (2006.01)

(52) U.S. Cl.
CPC .......... *E21B 33/14* (2013.01); *C04B 2103/46* (2013.01); *E21B 33/138* (2013.01)

(58) Field of Classification Search
USPC ........................................................ 166/293
See application file for complete search history.

(56) References Cited

U.S. PATENT DOCUMENTS

| | | | |
|---|---|---|---|
| 6,590,025 B1 * | 7/2003 | Carlson ................. | C08F 8/30 |
| | | | 522/71 |
| 6,681,856 B1 | 1/2004 | Chatterji et al. | |
| 7,178,610 B2 * | 2/2007 | Bell ....................... | C09K 8/035 |
| | | | 166/305.1 |
| 2001/0241484 | 12/2001 | Uchida et al. | |
| 2004/0241484 A1 | 12/2004 | Uchida et al. | |
| 2013/0261220 A1 | 10/2013 | Murphy | |

FOREIGN PATENT DOCUMENTS

| | | |
|---|---|---|
| EP | 1031544 A2 | 8/2000 |
| JP | H01-153559 A | 6/1989 |
| JP | H04-126788 A | 4/1992 |
| JP | H11-209154 A | 8/1999 |
| JP | 2009-522188 A | 6/2009 |
| JP | 2009-161373 A | 7/2009 |
| WO | 2010020350 A1 | 2/2010 |

OTHER PUBLICATIONS

International Search Report and Written Opinion issued in related PCT Application No. PCT/US2013/071627 dated Aug. 26, 2014, 14 pages.
Kawamura, K. et al.: "Cement slurries with high water-holding capacity", Chemical Abstracts, vol. 112, No. 14, Apr. 2, 1990, XP000151929, ISSN: 0009-2258 (1 page).
Search Report issued in related EP Application No. 13897959.6, dated Mar. 13, 2017 (6 pages).
Search Report issued in related JP Application No. 2016-525951, dated Mar. 21, 2017 (4 pages).
Office Action issued in related JP Application No. 2016-525951, dated Oct. 10, 2017 (4 pages).
Office Action issued in related JP Application No. 2016-525951, dated Apr. 9, 2018 (2 pages).
Office Action in related Indian Application No. 201617012445, dated Jul. 17, 2018 (received from foreign agent on October 25, 2018), 6 pages.

* cited by examiner

CEMENT WITH RESILIENT LATEX POLYMER

CROSS-REFERENCE TO RELATED APPLICATIONS

The present application is a U.S. National Stage Application of International Application No. PCT/US2013/071627 filed Nov. 25, 2013, which is incorporated herein by reference in its entirety for all purposes.

TECHNICAL FIELD

The disclosure is in the field of producing crude oil or natural gas from subterranean formations. More specifically, the disclosure generally relates to compositions and methods for cementing in a well.

BACKGROUND

In a primary cementing operation in a well, a hydraulic cement composition is pumped into an annular space between the wall of the wellbore and the casing. The set cement sheath supports the casing and bonds with the wellbore. The set cement sheath prevents the migration of fluids and gas outside the casing toward the surface of the well.

The set cement sheath must be capable of sustaining high hydrostatic pressure in order to achieve effective zonal isolation. The sheath may fail due to stresses induced by high fluid pressures or high temperatures inside the casing. A high internal pressure results in expansion of the casing, which can cause cracks in the sheath. Similarly, a set cement sheath may be subjected to stresses and fail as a result of creeping of the surrounding subterranean formation.

In order to overcome the stress induced cement failure, elastomeric particulates have been incorporated in the cement composition to enhance the resiliency. Since these materials are solid particles and have a particle size larger than that of the hydraulic cement, silica, and other cement additives, they increase the slurry viscosity.

In general, liquid additives are preferred in some field locations and off shore fields. A copolymer of styrene-butadiene in liquid form (styrene-butadiene latex) is an additive for cement known to increase the resiliency of the set cement to some extent; however, greater resiliency than can be provided by styrene-butadiene latex is desired. Therefore, there is a need to identify a liquid composition that can provide better resiliency to a set hydraulic cement composition.

SUMMARY OF THE DISCLOSURE

Compositions are disclosed, the compositions comprising: (i) a hydraulic cement; and (ii) a polymer comprising at least one monomer having an oxazoline group.

Methods of cementing in a well are disclosed, the methods comprising: (A) forming a hydraulic cement composition comprising: (i) a hydraulic cement; (ii) a polymer comprising at least one monomer having an oxazoline group; and (iii) water; (B) introducing the hydraulic cement composition into the well.

In various embodiments, the polymer is in a liquid or solid form. For example, if insoluble in water, microparticles of such a polymer in liquid form can be dispersed in water, which can form a latex.

In various embodiments, the polymer comprises at least one mono-vinyl monomer and at least one di-vinyl monomer. For example, the mono-vinyl monomer can be selected from the group consisting of: acrylic acid, methacrylic acid, acrylic acid esters, methacrylic acid esters, 2-isopropenyl-2-oxazoline, styrene, acrylonitrile, alkyl vinyl ethers, and alkoxy vinyl ethers. The di-vinyl monomer can be selected from the group consisting of: alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, and allyl acrylate.

In various embodiments, the polymer is in a solid particulate form of a cross-linked copolymer of styrene, butyl acrylate, divinylbenzene, and 2-isopropenyl-2-oxazoline ("SBDI"). In various embodiments, the molar proportions of the monomers in the copolymer are in the range of styrene about 10% to about 35%, butyl acrylate about 25% to about 60%, divinylbenzene about 2% to about 15%, and 2-isopropenyl-2-oxazoline about 10 to about 40%. Such a polymer may control fluid loss during pumping of a hydraulic cement composition and provides greater resiliency to the hydraulic cement composition after it sets.

In some embodiments, hydraulic cement compositions with such an SBDI polymer are provided. In addition, in some embodiments methods of cementing in a well are provided using such hydraulic cement compositions.

An SBDI latex was tested in a cement slurry for fluid control and mechanical properties, the experiment and results are discussed below. Such an SBDI latex can provide one or more of the following advantages in a hydraulic cement composition: (a) control fluid loss during pumping into a well; and (b) provide greater resiliency to the set cement than styrene-butadiene latex.

Without necessarily being limited by any theory, it is presently believed that a polymeric material including a monomer having an oxazoline group can provide one or more of such benefits when used in a cement composition.

BRIEF DESCRIPTION OF THE DRAWING

The accompanying drawing is incorporated into the specification to help illustrate examples according to a presently preferred embodiment of the disclosure.

DETAILED DESCRIPTION OF PRESENTLY PREFERRED EMBODIMENTS AND BEST MODE

Definitions and Usages

General Interpretation

Figure 1:
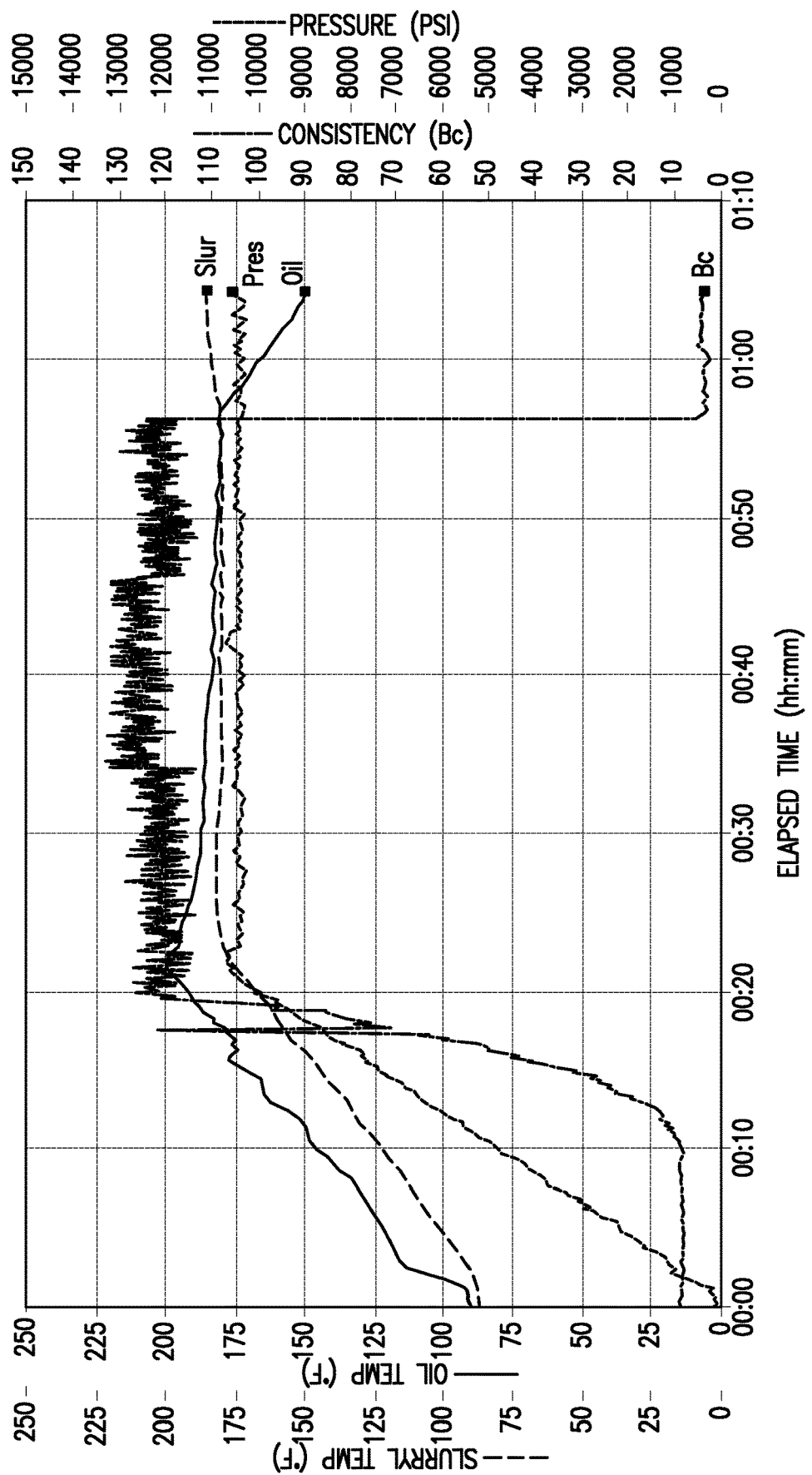
FIG. 1 is a thickening time chart for a hydraulic cement composition comprising styrene-butadiene latex (Slurry Design F).
Figure 2:
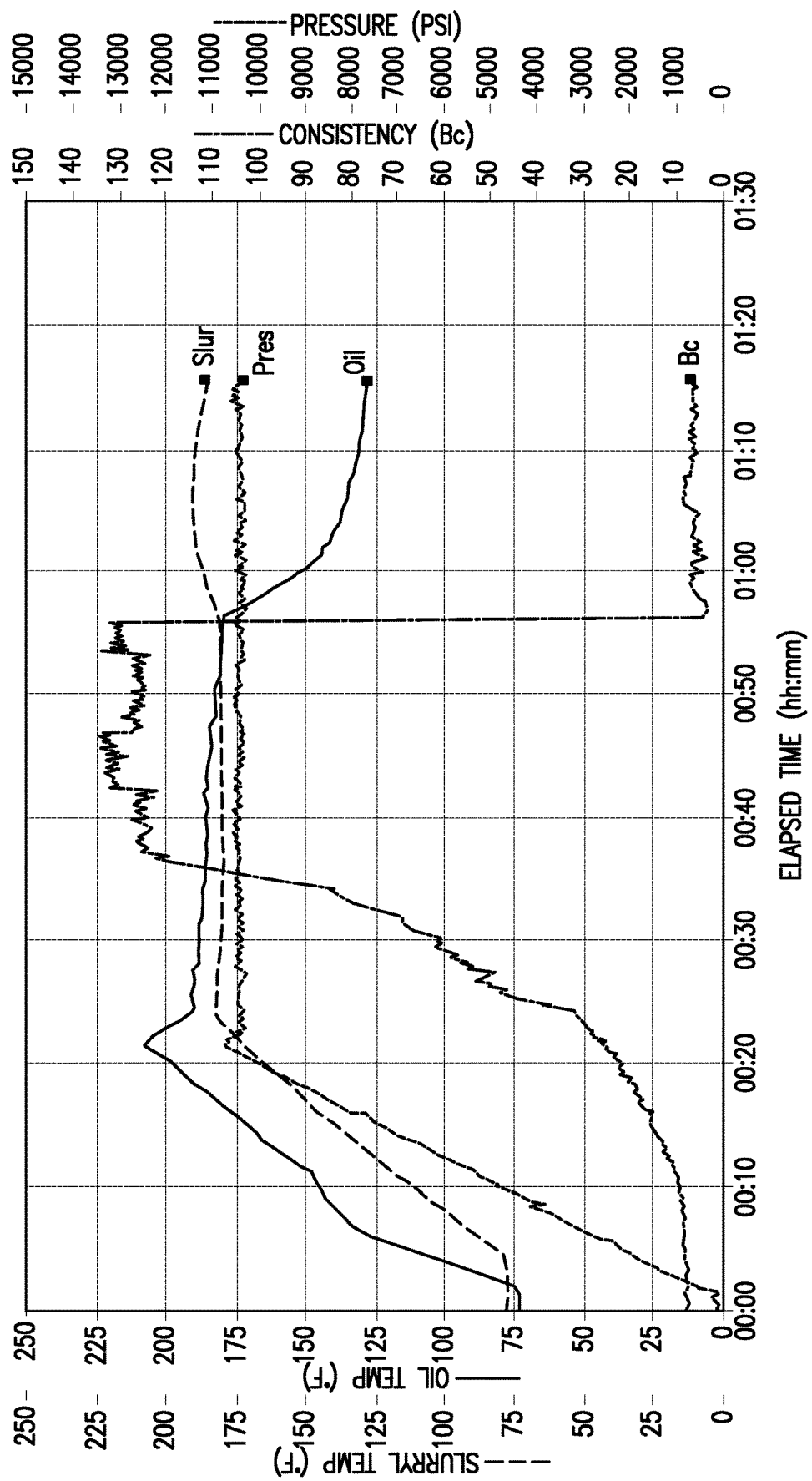
FIG. 2 is a thickening time chart for a hydraulic cement composition comprising SBDI latex (Slurry Design G).
Figure 3:
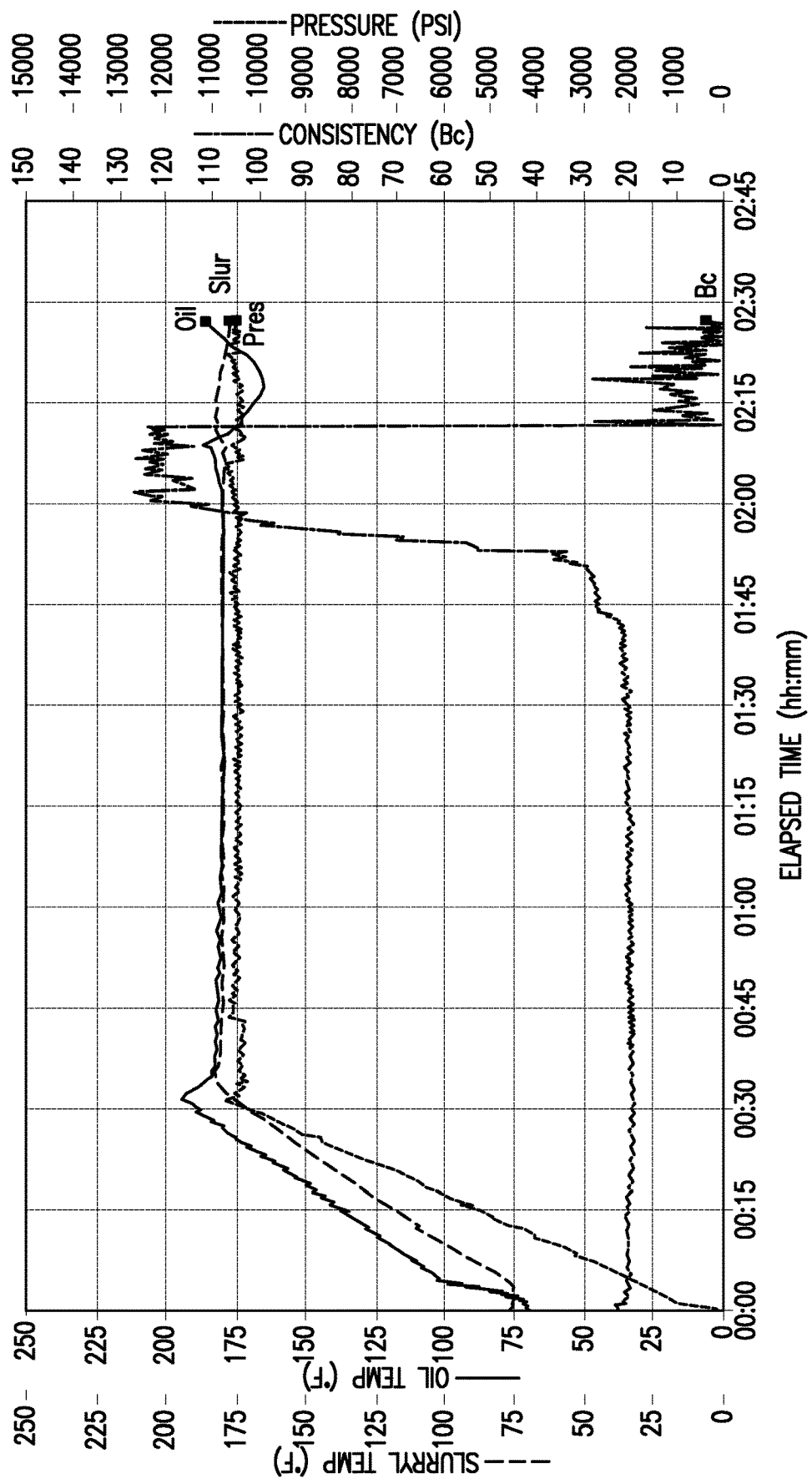
FIG. 3 is a thickening time chart for a hydraulic cement composition comprising styrene-butadiene latex (Slurry Design H).
Figure 4:
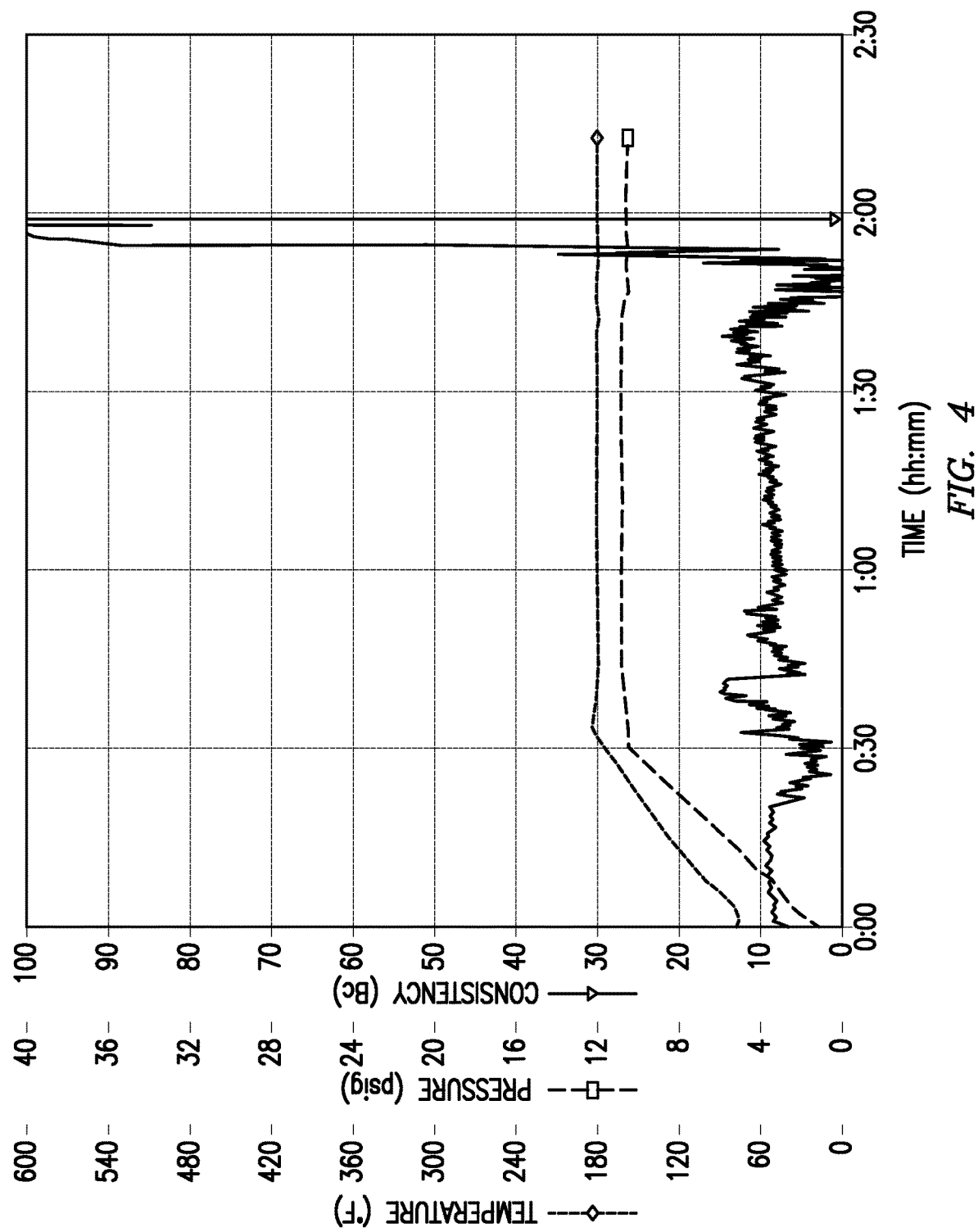
FIG. 4 is a thickening time chart for a hydraulic cement composition comprising SBDI latex (Slurry Design I).
Figure 5:
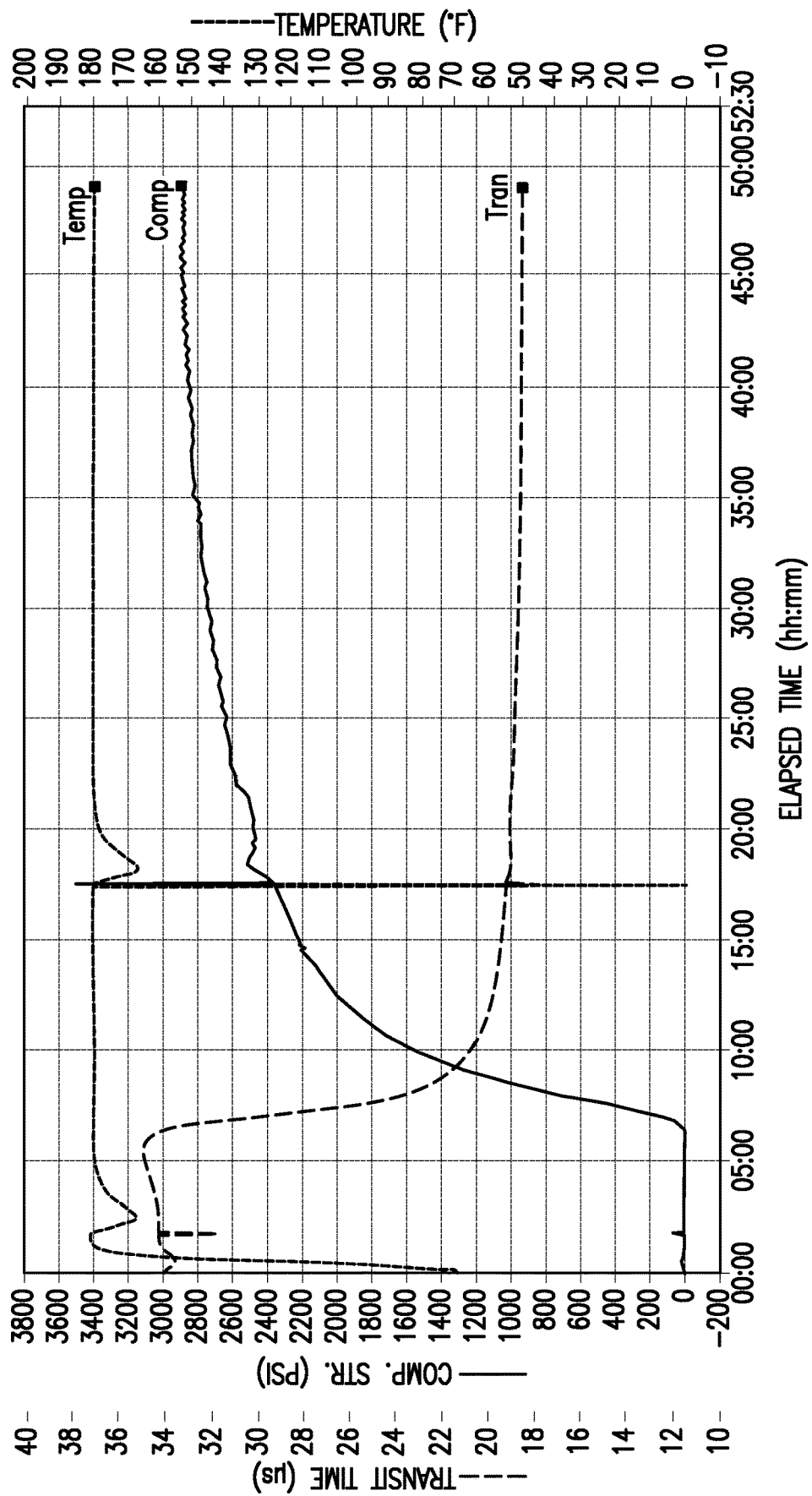
FIG. 5 is a UCA chart of compressive strength for a hydraulic cement composition comprising styrene-butadiene latex (Slurry Design H).
Figure 6:
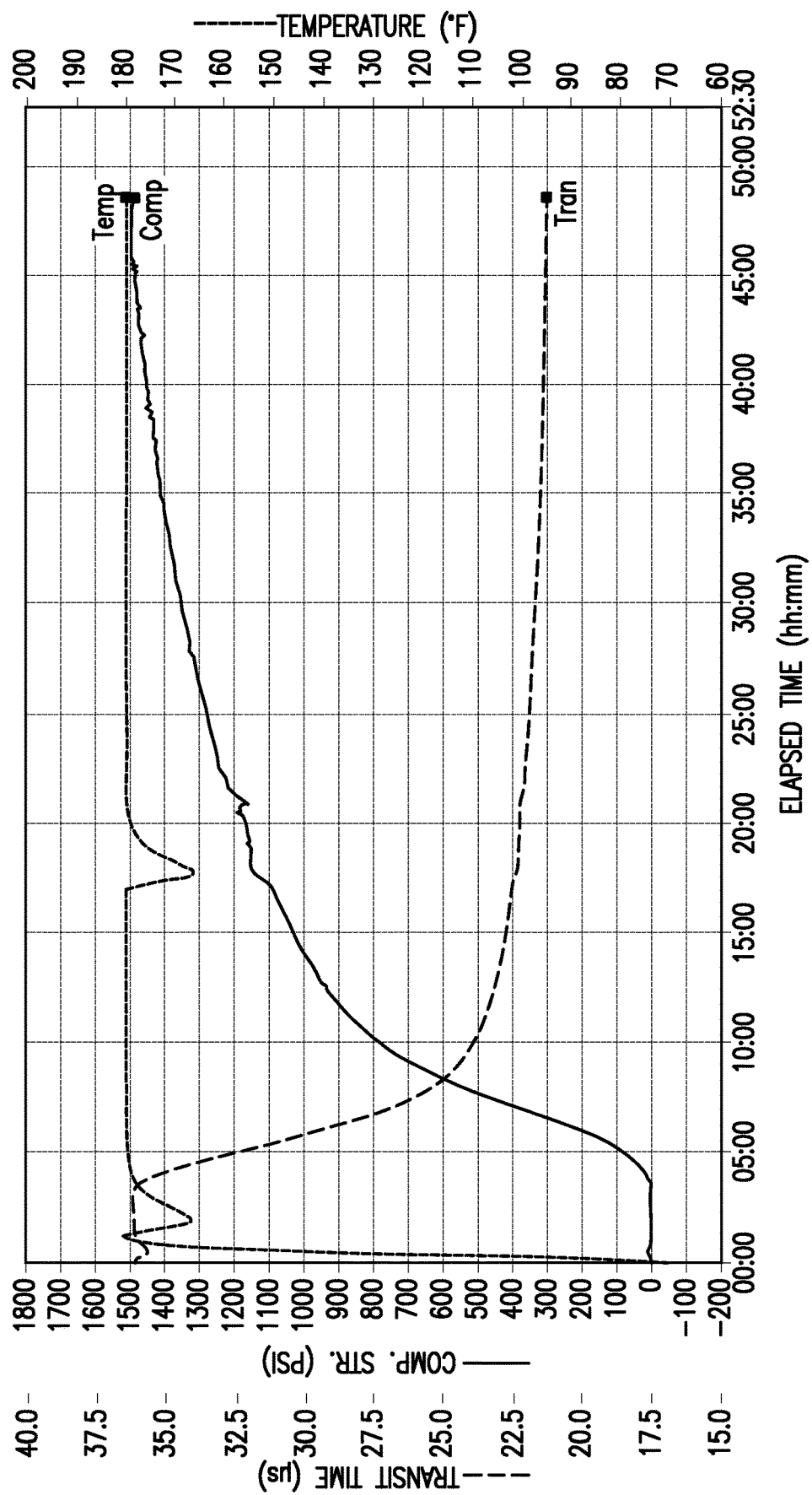
FIG. 6 is a UCA chart of compressive strength for a hydraulic cement composition comprising SBDI latex (Slurry Design I).

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Servicing and Fluids

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Hydraulic cement compositions can also be utilized in intervention operations, such as in plugging highly permeable zones, or fractures in zones, that may be producing too much water, plugging cracks or holes in pipe strings, and the like.

Completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a line pipe, and a transportation pipe.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular, such as a production tubing string, and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

A fluid can be, for example, a drilling fluid, a setting composition such as a hydraulic cement composition, a treatment fluid, or a spacer fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to a zone into which a fluid is directed to flow from the wellbore. As used herein, "into a treatment zone" means into and through the wellhead and, additionally, through the wellbore and into the treatment zone.

As used herein, a "downhole" fluid is an in-situ fluid in a well, which may be the same as a fluid at the time it is introduced, or a fluid mixed with another fluid downhole, or a fluid in which chemical reactions are occurring or have occurred in-situ downhole.

Fluid loss refers to the undesirable leakage of a fluid phase of any type of fluid into the permeable matrix of a zone, which zone may or may not be a treatment zone.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases, Physical States, and Materials

As used herein, "phase" is used to refer to a substance having a chemical composition and physical state that is distinguishable from an adjacent phase of a substance having a different chemical composition or a different physical state.

The word "material" refers to the substance, constituted of one or more phases, of a physical entity or object. Rock, water, air, metal, cement slurry, sand, and wood are all examples of materials. The word "material" can refer to a single phase of a substance on a bulk scale (larger than a particle) or a bulk scale of a mixture of phases, depending on the context.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

Polymers and Latex

As used herein, unless the context otherwise requires, a "polymer" or "polymeric material" includes homopolymers, copolymers, terpolymers, etc. In addition, the term "copolymer" as used herein is not limited to the combination of polymers having two monomeric units, but includes any combination of monomeric units, for example, terpolymers, tetrapolymers, etc.

It should be understood, of course, that a polymer is formed by a chemical reaction of one or more monomers. A polymer having or comprising one or more monomers is understood to refer to being formed from the one or more monomers.

Latex is the stable dispersion (emulsion) of polymer microparticles in an aqueous medium. A latex may be natural or synthetic. A latex can be made synthetically, for example, by polymerizing a monomer such as styrene that has been emulsified with surfactants.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. For example, a fluid can be in the form of a suspension or slurry (solid particles dispersed in a liquid phase), an emulsion (liquid particles dispersed in another liquid phase), or a foam (a gas phase dispersed in a liquid phase).

General Measurement Terms

Unless otherwise specified or unless the context otherwise clearly requires, any ratio or percentage means by weight.

Unless otherwise specified or unless the context otherwise clearly requires, the phrase "by weight of cement" means by weight of the hydraulic cement.

If there is any difference between U.S. or Imperial units, U.S. units are intended. For example, "ppg" means pounds per U.S. gallon.

As used herein, a "sack" ("sk") is an amount that weighs 94 pounds (94 lb/sk).

As used herein, the conversion between gallon per sack (gal/sk) and percent by weight of cement (% bwoc) is 1 gal/sk=3.96% bwoc.

Cementing and Hydraulic Cement Compositions

In a cementing operation, a hydraulic cement, water, and any other components are mixed to form a hydraulic cement composition in fluid form. The hydraulic cement composition is pumped as a fluid (typically in the form of suspension or slurry) into a desired location in the wellbore.

For example, in cementing a casing or liner, the hydraulic cement composition is pumped into the annular space between the exterior surfaces of a pipe string and the borehole (that is, the wall of the wellbore). The hydraulic cement composition should be a fluid for a sufficient time before setting to allow for pumping the composition into the wellbore and for placement in a desired downhole location in the well. The cement composition is allowed time to set in the annular space, thereby forming an annular sheath of hardened, substantially impermeable cement. The hardened cement supports and positions the pipe string in the wellbore and fills the annular space between the exterior surfaces of the pipe string and the borehole of the wellbore. Consequently, oil or gas can be produced in a controlled manner by directing the flow of oil or gas through the casing and into the wellhead.

Cement compositions can also be used, for example, in well-plugging operations or gravel-packing operations. Cement compositions can also be used to control fluid loss or migration in zones.

Cement and Cement Compositions

In the most general sense of the word, a "cement" is a binder, that is, a substance that sets and can bind other materials together. As used herein, "cement" refers to an inorganic cement that, when mixed with water, will begin to set and harden into a concrete material.

As used herein, a "cement composition" is a material including at least one inorganic cement. A cement composition can also include additives. Some cement compositions can include water or be mixed with water. Depending on the type of cement, the chemical proportions, when a cement composition is mixed with water it can begin setting to form a solid material.

A cement can be characterized as non-hydraulic or hydraulic.

Non-hydraulic cements (for example, gypsum plaster, Sorel cements) must be kept dry in order to retain their strength. A non-hydraulic cement produces hydrates that are not resistant to water. If the proportion of water to a non-hydraulic cement is too high, the cement composition will not set into a hardened material.

Hydraulic cements (for example, Portland cement) harden because of hydration, chemical reactions that occur independently of the mixture's water content; they can harden even underwater or when constantly exposed to wet weather. The chemical reaction that results when the dry cement powder is mixed with water produces hydrates that have extremely low solubility in water.

More particularly, Portland cement is formed from a clinker such as a clinker according to the European Standard EN197-1: "Portland cement clinker is a hydraulic material which shall consist of at least two-thirds by mass of calcium silicates (3 CaO.SiO2 and 2 CaO.SiO2), the remainder consisting of aluminium- and iron-containing clinker phases and other compounds. The ratio of CaO to SiO2 shall not be less than 2.0. The magnesium oxide content (MgO) shall not exceed 5.0% by mass." The American Society of Testing Materials ("ASTM") standard "C 150" defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." In addition, Portland cements typically have a ratio of CaO to $SiO_2$ of less than 4.0.

The American Society for Testing and Materials (ASTM) has established a set of standards for a Portland cement to meet to be considered an ASTM cement. These standards include Types I, II, III, IV, and V.

The American Petroleum Institute (API) has established a set of standards that a Portland cement must meet to be considered an API cement. The standards include Classes A, B, C, D, E, F, G, H, I, and J.

Slag cement (also known as ground granulated blast-furnace slag or "GGBFS", is a low CaO cement. As used herein, slag cement has a ratio of CaO to SiO2 that is less than 1.0.

A blended cement is a hydraulic cement produced by intergrinding Portland cement clinker with other materials, by blending Portland cement with other materials, or by a combination of intergrinding and blending.

Cement Additives

A common additive is silica (silica dioxide). Silica is commonly added as a strength-stabilizing agent for the set cement. SSA-1™ agent (also called silica flour) is a powdered sand that helps oilwell cement maintain low permeability and high compressive strength under high-temperature conditions. SSA-1™ agent is recommended for use in cementing wells where static temperatures exceed 230° F. Above this temperature, most cement compositions exhibit satisfactory compressive strength after the initial set but will rapidly lose strength after continued exposure to high temperatures. SSA-1™ agent helps prevent this problem by chemically reacting with the cement at high temperatures. SSA-1™ agent has been widely used in thermal recovery wells in combination with refractory-type cements. SSA-1™ agent is mined and processed in the following two forms: (a) in a minus 200-mesh powder for maximum reactivity in cement concentrations of normal weight; and (b) in a selected particle-gradation design for densified cements where increased weights and maximum reactivity are required.

Fly ash is made from burned coal and is a common additive in cement compositions. POZMIX™ pozzolanic cement additive is a fly ash made from burned coal. This additive helps lighten the slurry and enhance its pumping properties. This additive can be used at bottomhole temperatures (BHTs) between 80° F. and 550° F. (27° C. to 288° C.). Typical hydraulic cement slurries with POZMIX™ additive are 50/50 blends of POZMIX™ additive and hydraulic cement. POZMIX™ additive is compatible with all classes of hydraulic cement. It also reacts with lime to produce a cement-like material. MICRO FLY ASH™ pozzolanic cement additive is a fly ash with a particle size from 3 micrometer to 9 micrometer. MICRO FLY ASH™ pozzolanic cement additive is commercially available from Halliburton Energy Services, Inc. in Duncan, Okla.

Cement compositions can contain other additives, including but not limited to resins, latex, stabilizers, microspheres, aqueous superabsorbers, viscosifying agents, suspending agents, dispersing agents, salts, accelerants, surfactants, retarders, defoamers, high-density materials, low-density materials, fluid-loss control agents, elastomers, vitrified shale, gas migration control additives, formation conditioning agents, or other additives or modifying agents, or combinations thereof.

An example of an additive is a high-density additive. As used herein, a "high-density" additive is an additive that has a density greater than 3 g/cm$^3$. Some metal oxides can be used as a high-density additive. As used herein, a "metal oxide" is a metal cation or transition metal cation with an oxide anion. Examples of metal oxides include, but are not limited to, iron oxide ($Fe_2O_3$) and manganese oxide ($Mn_3O_4$). A commercially available example of an iron oxide high-density additive is HI-DENSE™ and an example of a commercially available manganese oxide is MICROMAX™, both available from Halliburton Energy Services, Inc. in Duncan, Okla.

For example, MICROMAX™ weight additive increases slurry density with hausmannite ore ground to an average particle size of 5 microns. Unlike most weighting materials, MICROMAX™ weight additive remains in suspension when added directly to mixing water. MICROMAX™ weight additive can be used at bottomhole circulating temperatures between 80° F. and 500° F. (27° C. to 260° C.). In deep wells with high temperatures and pressures, MICROMAX™ weight additive can help restrain formation pressures and improve mud displacement. Additive concentrations depend on the slurry weight designed for individual wells. Because of the fine-ground ore in MICROMAX™ weight additive, higher concentrations of retarders might be required to achieve the thickening times provided by other types of weight additives. Slurries of cement compositions containing MICROMAX™ weight additive might also require the addition of dispersants. MICROMAX™ weight additive is commercially available from Halliburton Energy Services, Inc. in Duncan, Okla.

Of course, additives should be selected for not interfering with the purpose of the fluid.

Pumping Time and Thickening Time

During placement of a cement composition, it is necessary for the cement composition to remain pumpable during introduction into the subterranean formation or the well and until the cement composition is situated in the portion of the subterranean formation or the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the cement composition to set.

As used herein, the "pumping time" is the total time required for pumping a hydraulic cementing composition into a desired portion or zone of the well in a cementing operation plus a safety factor.

As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a setting fluid is considered to be "pumpable" so long as the fluid has an apparent viscosity less than 30,000 mPa·s (cP) (independent of any gel characteristic) or a consistency of less than 70 Bc. A setting fluid becomes "unpumpable" when the consistency of the composition reaches at least 70 Bc.

As used herein, the consistency of a cement composition is measured according to ANSI/API Recommended Practice 10B-2 as follows. The cement composition is mixed and then placed in the test cell of a High-Temperature, High-Pressure (HTHP) consistometer, such as a FANN™ Model 275 or a CHANDLER™ Model 8240. The cement composition is tested in the HTHP consistometer at the specified temperature and pressure. Consistency measurements are taken continuously until the consistency of the cement composition exceeds 70 Bc.

Of course, the thickening time should be greater than the pumping time for a cementing operation.

Setting and Compressive Strength

As used herein, the term "set" means the process of becoming solid and hard by curing.

Depending on the composition and the conditions, it can take just a few minutes up to 72 hours or longer for some cement compositions to initially set. A cement composition sample that is at least initially set is suitable for destructive compressive strength testing.

Compressive strength is defined as the capacity of a material to withstand axially directed pushing forces. The compressive strength a setting composition attains is a function of both curing time and temperature, among other things.

The compressive strength of a cement composition can be used to indicate whether the cement composition has set. As used herein, a cement composition is considered "initially set" when the cement composition has developed a compressive strength of 50 psi (345 kPa) using the non-destructive compressive strength method. As used herein, the "initial setting time" is the difference in time between when the cement is mixed with water and when the cement composition is initially set. Some cement compositions can continue to develop a compressive strength greater than 50 psi (345 kPa) over the course of several days. The compressive strength of certain kinds of cement compositions can reach over 10,000 psi (70,000 kPa).

Compressive strength is typically measured at a specified time after the cement composition has been mixed and at a specified temperature and pressure conditions. If not otherwise stated, the setting and the initial setting time is determined at a temperature of 212° F. (100° C.) and an atmospheric pressure of 3,000 psi (20,700 kPa). Compressive strength can also be measured at a specific time and temperature after the cement composition has been mixed, for example, in the range of about 24 to about 72 hours at a design temperature and pressure, for example, a temperature of 212° F. (100° C.) and 3,000 psi (20,700 kPa). According to ANSI/API Recommended Practice 10B-2, compressive strength can be measured by either a destructive method or non-destructive method.

The destructive method mechanically tests the strength of cement composition samples at various points in time by crushing the samples in a compression-testing machine. The destructive method is performed as follows. The cement composition is mixed and then cured. The cured cement composition sample is placed in a compressive strength testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression device. The actual compressive strength is reported in units of pressure, such as pound-force per square inch (psi) or megapascals (MPa).

The non-destructive method continually measures a correlated compressive strength of a cement composition sample throughout the test period by utilizing a non-destructive sonic device such as an Ultrasonic Cement Analyzer (UCA) available from Fann Instruments in Houston, Tex. As used herein, the "compressive strength" of a cement composition is measured utilizing an Ultrasonic Cement Analyzer as follows. The cement composition is mixed. The cement composition is placed in an Ultrasonic Cement Analyzer, in which the cement composition is heated to the specified temperature and pressurized to the specified pressure. The UCA continually measures the transit time of the acoustic signal through the sample. The UCA device contains preset algorithms that correlate transit time through the sample to compressive strength. The UCA reports the compressive strength of the cement composition in units of pressure, such as psi or megapascals (MPa).

Cement Testing Conditions

As used herein, if any test (for example, thickening time or compressive strength) requires the step of mixing the setting composition, cement composition, or the like, then the mixing step is performed according to ANSI/API Recommended Practice 10B-2 as follows. Any of the ingredients that are a dry particulate substance are pre-blended. The liquid is added to a mixing container and the container is then placed on a mixer base. For example, the mixer can be a Lightning Mixer. The motor of the base is then turned on and maintained at about 4,000 revolutions per minute (rpm). The pre-blended dry ingredients are added to the container at a uniform rate in not more than 15 seconds (s). After all the dry ingredients have been added to the liquid ingredients in the container, a cover is then placed on the container, and the composition is mixed at 12,000 rpm (+/−500 rpm) for 35 s (+/−1 s). It is to be understood that the composition is mixed under Standard Laboratory Conditions (about 77° F. and about 1 atmosphere pressure).

It is also to be understood that if any test (for example, thickening time or compressive strength) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 77° F. (25° C.) and then placed into the testing apparatus and the temperature of the cement composition can be ramped up to the specified temperature. As used herein, the rate of ramping up the temperature is in the range of about 3° F./min to about 5° F./min. After the cement composition is ramped up to the specified temperature and possibly pressure, the cement composition is maintained at that temperature and pressure for the duration of the testing.

As used herein, if any test (for example, compressive strength) requires the step of "curing the cement composition" or the like, then the curing step is performed according to ANSI/API Recommended Practice 10B-2 as follows. After the cement composition has been mixed, it is poured into a curing mold. The curing mold is placed into a pressurized curing chamber and the curing chamber is maintained at a temperature of 212° F. (100° C.) and a pressure of 3,000 psi (20,700 kPa). The cement composition is allowed to cure for the length of time necessary for the composition to set. After the composition has set, the curing mold is placed into a water cooling bath until the cement composition sample is tested.

Cement Retarders and Intensifiers

It is important to maintain a cement in a pumpable slurry state until it is placed in a desired portion of the well. For this purpose, a set retarder can be used in a cement slurry, which retards the setting process and provides adequate pumping time to place the cement slurry. Alternatively or in addition, a set intensifier can be used, which accelerates the setting process. The use of retarder or intensifier can be used to help control the thickening time or setting of a cement composition.

Without being limited by any theory, it is believed a retarder works by one or more of the principles of chelation, adsorption, or precipitation.

The selection of retarder depends upon the well temperature. In addition, different retarding of thickening time can be achieved at particular temperature by varying the concentration of the retarder in the cement composition. Some of the retarders work at a low temperature range while others work at high temperature range.

As used herein, a "retarder" is a chemical agent used to increase the thickening time of a cement composition. The need for retarding the thickening time of a cement composition tends to increase with depth of the zone to be cemented due to the greater time required to complete the cementing operation and the effect of increased temperature on the setting of the cement. A longer thickening time at the design temperature allows for a longer pumping time that may be required.

Method of Cementing in a Well

According to another embodiment of the disclosure, a method of treating a well, is provided, the method including the steps of: forming a hydraulic cement composition (as a slurry) according to the disclosure; and introducing the composition into the well.

Forming Fluid

A fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In certain embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing Into Well or Zone

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

Introducing Below Fracture Pressure

In various embodiments, the step of introducing is at a rate and pressure below the fracture pressure of the treatment zone.

Allowing Time for Setting in the Well

After the step of introducing the cement composition into the well or zone, time is allowed for setting of the cement composition. This preferably occurs with time under the conditions in the zone of the subterranean fluid.

Producing Hydrocarbon from Subterranean Formation

Preferably, after any such use of a fluid according to the disclosure, a step of producing hydrocarbon from the well or a particular zone is the desirable objective.

EXAMPLES

To facilitate a better understanding of the present disclosure, the following examples of certain aspects of some embodiments are given. In no way should the following examples be read to limit, or define, the entire scope of the disclosure.

SBDI Latex

In the examples including SBDI latex, the styrene-butylacrylate-divinylbenzene-2-isopropenyloxazoline latex had the following characteristics: appearance was that of a milky white emulsion; the solids content was 39.8%; the specific gravity was 1.05; the pH was 8.2; and the glass transition temperature was −58° F. (−50° C.).

Cement Slurry Designs

Hydraulic cement slurries A-E were prepared having a density of about 16.8 ppg (2.01 kg/l) with a styrene butadiene latex or an SBDI latex and with other additives as summarized in Table 1. The hydraulic cement slurries comprising styrene-butadiene latex were prepared for the purpose of comparison to the slurries with SBDI latex.

TABLE 1

Slurry designs having density of 16.8 ppg (2.01 kg/l)

| | Concentration | | | | |
|---|---|---|---|---|---|
| Material | Slurry Design A | Slurry Design B | Slurry Design C | Slurry Design D | Slurry Design E |
| Water | 26.32% bwoc | 26.50% bwoc | 26.54% bwoc | 26.72% bwoc | 24.71% bwoc |
| Class H Cement | 100.00 | 100.00 | 100.00 | 100.00 | 100.00 |
| Crystalline silica particulate | 35.00% bwoc | 35.00% bwoc | 35.00% bwoc | 35.00% bwoc | 35.00% bwoc |
| Cement retarder | 0.80% bwoc | 0.80% bwoc | 0.4% bwoc | 0.4% bwoc | — |
| Dispersant | 0.05 gal/sk | 0.05 gal/sk | 0.02 gal/sk | 0.02 gal/sk | 0.05 gal/sk |
| Styrene-butadiene latex | 2.00 gal/sk | — | 2.00 gal/sk | — | — |
| SBDI latex | — | 2.00 gal/sk | — | 2.00 gal/sk | 2.00 gal/sk |
| NaCl | — | — | — | — | 18 w/w |
| Stabilizer | — | — | — | — | 0.4 gal/sk |
| Defoamer | 0.02 gal/sk | 0.02 gal/sk | 0.02 gal/sk | 0.02 gal/sk | 0.02 gal/sk |

In addition, hydraulic cement slurries F-I were prepared having a density of about 16.8 ppg (2.01 kg/l) with a styrene butadiene latex or an SBDI latex and with other additives as summarized in Table 2. The hydraulic cement slurries comprising styrene-butadiene latex were prepared for the purpose of comparison to the slurries with SBDI latex.

TABLE 2

Composition of the slurry having density of 16.8 ppg (2.01 kg/l)

| | Concentration | | | |
|---|---|---|---|---|
| Material | Slurry Design F | Slurry Design G | Slurry Design H | Slurry Design I |
| Water | 27.25% bwoc | 27.34% bwoc | 18.47% bwoc | 18.65% bwoc |
| Class H Cement | 100 | 100 | 100 | 100 |
| Dispersant | 0.02 gal/sk | 0.02 gal/sk | 0.02 gal/sk | 0.02 gal/sk |
| Styrene-butadiene latex | 1 gal/sk | — | 2 gal/sk | — |
| SBDI latex | — | 1 gal/sk | — | 2 gal/sk |
| Defoamer | 0.02 gal/sk | 0.02 gal/sk | 0.02 gal/sk | 0.02 gal/sk |

Class H cement is a class of hydraulic cement. Other classes of hydraulic cement may be used.

Crystalline silica particulate is preferably included in a hydraulic cement composition for cementing in a well. It can be included in the range of about 5% bwoc to about 50% bwoc, and is normally used in the range of about 10% bwoc to about 35% bwoc.

A cement retarder is optionally and commonly used in hydraulic cement slurries used for well application to increase the thickening time. An example of a cement retarder is a mixture of lignosulfonate and an organic acid. Other examples of cement retarders included, without limitation, organic acids, lignosulfonates, phosphates, phosphonates, sugars, carboxylic acid polymers, and borates. The concentration of a cement retarder depends on the thickening time requirement. For example, a cement retarder can be included in the range of about 0.05% bwoc to about 5% bwoc. Generally, a cement retarder can be used in the range of about 0.1% bwoc to about 3% bwoc.

A dispersant is optionally and commonly used in hydraulic cement slurries used for well applications. The dispersant in the present example was an organo sulfur product. Other examples of dispersants include, without limitation, polycarboxylate ethers and sulfonated polymers. For example, a dispersant can be included in the range of about 0.01 gallon per sack if cement ("gal/sk") to about 0.1 gal/sk.

A defoamer is optionally and commonly used in hydraulic cement slurries used for well applications. The defoamer in the present example was a siloxane product. Other examples of defoamers include glycols. For example, a dispersant can be included in the range of about 0.02 gal/sk to about 0.1 gal/sk of cement.

An inorganic salt may be included as an additive or the water may otherwise have salt therein, such as a brine. One of the purposes of an inorganic salt additive can be to increase the density of the cement composition. Examples of suitable inorganic salts include, without limitation, sodium chloride, potassium chloride, and other salts.

A stabilizer (surfactant) may be included as an additive. One of the purposes of a stabilizer is to prevent the de-emulsification of the latex in the water of the composition.

Rheology and Fluid Loss

Rheology of the cement slurries was measured. A FANN™ model 35 is a standard instrument used to measure the rheological properties of fluids. Measurement was done as per API 10B-2/IS010426-2. This viscometer is a rotational viscometer with Couette geometry.

Fluid Loss was measured as follows. Solid materials were weighed and then blended thoroughly prior to adding them to the mixing fluid. Mixing container with the required mass of mix water and liquid additives was placed on the mixer base. The blend of solid materials was added at a uniform rate within 15 seconds while mixing at 4,000 rpm. After the addition of all solid materials to the mix water, the mixing was done at 12,000 rpm for 35 seconds. Within 1 minute after mixing, the slurry was placed in the container of atmospheric-pressure consistometer and conditioned for 20 minutes at test temperature. A fluid loss cell was assembled and preheated to the test temperature. The slurry was poured into the cell and upper valve of cell was connected to pressure line. Pressure of 1,000 psi (6,895 kPa) was applied and filtrate was collected through the bottom valve of fluid loss cell. The amount of filtrate was measured at the end of 30 minutes and the value was doubled.

The rheology and fluid loss analysis for the cement slurry compositions A-E were carried out and the results are summarized in Table 3. The results show that the performance of SBDI latex is at least comparable with styrene-butadiene latex.

Sedimentation

Sedimentation tests were performed as follows. A sedimentation test tube was lightly greased inside and all joints to ensure that it was leak-tight and so that after setting the set cement could be removed without damage to the tube. The tube is inert to cement and does not deform during the course of the test. The sample slurry was poured into the sedimentation tube. The tube was closed with a lid and placed in an autoclave cell and then 3,000 psi (20,700 kPa) pressure applied. The slurry was allowed to cure for 24 hours at the test temperature. After curing, the autoclave chamber was allowed to cool to about 120° F. (49° C.) and then the pressure was released. The tube was removed from the cell and cooled to 80° F. (27° C.) by placing it in a water bath. The set cement was removed from the tube and marked top, middle, and bottom portions. The cement was sliced into three pieces of equal size for each of the portions. The weight of each portion was measured in air as well as in water. By applying the Archimedes' principle, relative density of each portion was calculated.

Sedimentation test results are summarized in Table 4. These results show that the density variation of the set cement is within the acceptable limits, that is, within 0.3 ppg (0.036 kg/l).

TABLE 4

Sedimentation test at 220° F. (104° C.)

| | Density | |
| --- | --- | --- |
| Sample | Slurry Design C | Slurry Design D |
| Top | 16.65 ppg (1.995 kg/l) | 16.73 ppg (2.005 kg/l) |
| Middle | 16.76 ppg (2.008 kg/l) | 16.86 ppg (2.020 kg/l) |
| Bottom | 16.90 ppg (2.025 kg/l) | 16.91 ppg (2.026 kg/l) |

Thickening Time, Compressive Strength, and Crush Strength

Thickening time of the cement slurry comprising styrene-butadiene latex or SBDI latex and was measured at 180° F. (82° C.) and 10,500 psi (72,400 kPa).

Compressive strength development was measured using an Ultrasonic Cement Analyzer at 180° F. (82° C.). The slurry sample was poured in a cell of an Ultrasonic Cement Analyzer. Pressure of 3,000 psi (20,700 kPa) was applied and the temperature schedule was programmed in the machine. The curing period begins with the recording of the transit time and the application of temperature and pressure,

TABLE 3

Rheology of the slurry and fluid loss

| Slurry Design | Temperature | Fann 35 Viscosity Number | | | | | | | | Fluid Loss API (ml) |
| --- | --- | --- | --- | --- | --- | --- | --- | --- | --- | --- |
| | | 600 | 300 | 200 | 100 | 60 | 30 | 6 | 3 | |
| A | 80° F. (27° C.) | 251 | 137 | 99 | 56 | 39 | 24 | 9 | 6 | — |
| | 160° F. (71° C.) | 126 | 71 | 49 | 28 | 19 | 11 | 3 | 2 | 36 |
| | 180° F. (82° C.) | 128 | 74 | 48 | 27 | 20 | 11 | 4 | 2 | 40 |
| B | 80° F. (27° C.) | 300+ | 195 | 138 | 75 | 50 | 29 | 10 | 6 | — |
| | 160° F. (71° C.) | 122 | 86 | 53 | 28 | 18 | 9 | 3 | 2 | 42 |
| | 180° F. (82° C.) | 138 | 70 | 47 | 24 | 15 | 8 | 2 | 1 | 48 |
| C | 80° F. (27° C.) | 296 | 163 | 122 | 72 | 50 | 30 | 10 | 7 | — |
| | 180° F. (82° C.) | 164 | 88 | 63 | 36 | 25 | 15 | 5 | 3 | 28 |
| D | 80° F. (27° C.) | 300+ | 199 | 140 | 80 | 53 | 32 | 12 | 9 | — |
| | 180° F. (82° C.) | 163 | 92 | 64 | 36 | 24 | 14 | 4 | 4 | 30 |
| E | 80° F. (27° C.) | 296 | 155 | 109 | 60 | 39 | 24 | 10 | 8 | — |
| | 180° F. (82° C.) | 285 | 148 | 108 | 61 | 42 | 25 | 8 | 5 | 46 | and continues until the test is terminated. Transit time is the time for an ultrasonic sound wave signal to travel between the transducers of the device. The transit time is shorter in a solid set cement than in an cement slurry. Change in transit time during the test period has been converted into compressive strength by inbuilt device.

Crush strength was measured as follows. Slurry was poured in a mold of 2.0 inch (5.1 cm)×2.0 inch (5.1 cm) size. The mold was placed in the cell of autoclave and applied the pressure of 3,000 psi (20,700 kPa). The temperature schedule was programmed in the machine. After curing the slurry at 180° F. (82° C.) for 96 hours, the heating chamber was allowed to cool 120° F. (49° C.) and then pressure was released. The cured cement sample removed from the mold and allowed to cool until it reaches 80° F. (27° C.). The cured sample was crushed using hydraulic press to measure the crush strength at room temperature.

The thickening time, compressive strength, and crush strength results are summarized in Table 5 (see FIGS. 1-6).

TABLE 5

Compressive and crush strength of samples

| Slurry Design | Thickening time to 70 Bc (hr:mm) | UCA Compressive strength at 180° F. (82° C.) | | *Crush Strength |
|---|---|---|---|---|
| | | Time to reach 50 psi (345 kPa) | 48 Hours Strength | |
| F | 00:17 | — | — | — |
| G | 00:32 | — | — | — |
| H | 1:56 | 6:43 | 2,906 psi (20,036 kPa) | 5,187 psi (35,763 kPa) |
| I | 1:54 | 4:39 | 1,498 psi (10,328 kPa) | 4,606 psi (31,757 kPa) |

*Average value of three measurements

The results of Table 5 show that the thickening time of SBDI latex slurry is comparable to that of styrene-butadiene latex slurry. SBDI latex provides early compressive strength of 50 psi (345 kPa) in comparison to styrene-butadiene latex. The ultimate strength at 48 hours for SBDI latex slurry was about half that for the styrene-butadiene latex slurry. In order to find out the value of compressive strength for latex slurries, it is advisable to determine crush strength. Therefore, the crush strength was measured by curing the slurry at 180° F. (82° C.) for 96 hours. The results show that the crush strength of cement comprising SBDI latex was slightly lower than that of styrene-butadiene latex. This could be due to the resiliency provided by SBDI latex to the set cement.

Mechanical Properties—Young's Modulus and Strain a Failure

Mechanical properties of the set cement samples were measured using hydraulic press (Universal Testing Machine) equipped with extensometers. Stress-Strain data obtained from inbuilt software for both axial and radial strains. Young's modulus is slope of the liner portion of Axial Stress-Axial Strain curve.

Measurements were done according to ASTM 7012-10. (1) Cement samples were cured in the form of cylinders with L/D ratio of 2. (2) Surface of the cylinders were sliced to achieve flat surface. (3) These samples were marked to position the extensometer. The axial extensometer was placed equidistance from the center. (4) Sample was tested for unconfined compressive strength and data for axial strain were captured. (5) This data was plotted as Stress versus strain. The slope of liner portion of the curve gives Young's modulus. (6) The above experiment provides strain at failure as well. It is a strain at which the sample undergo failure.

Cement slurries comprising styrene-butadiene latex or SBDI latex were prepared and cured at 180° F. (82° C.), 3,000 psi (2,700 kPa), for 96 hours.

Figure 7:
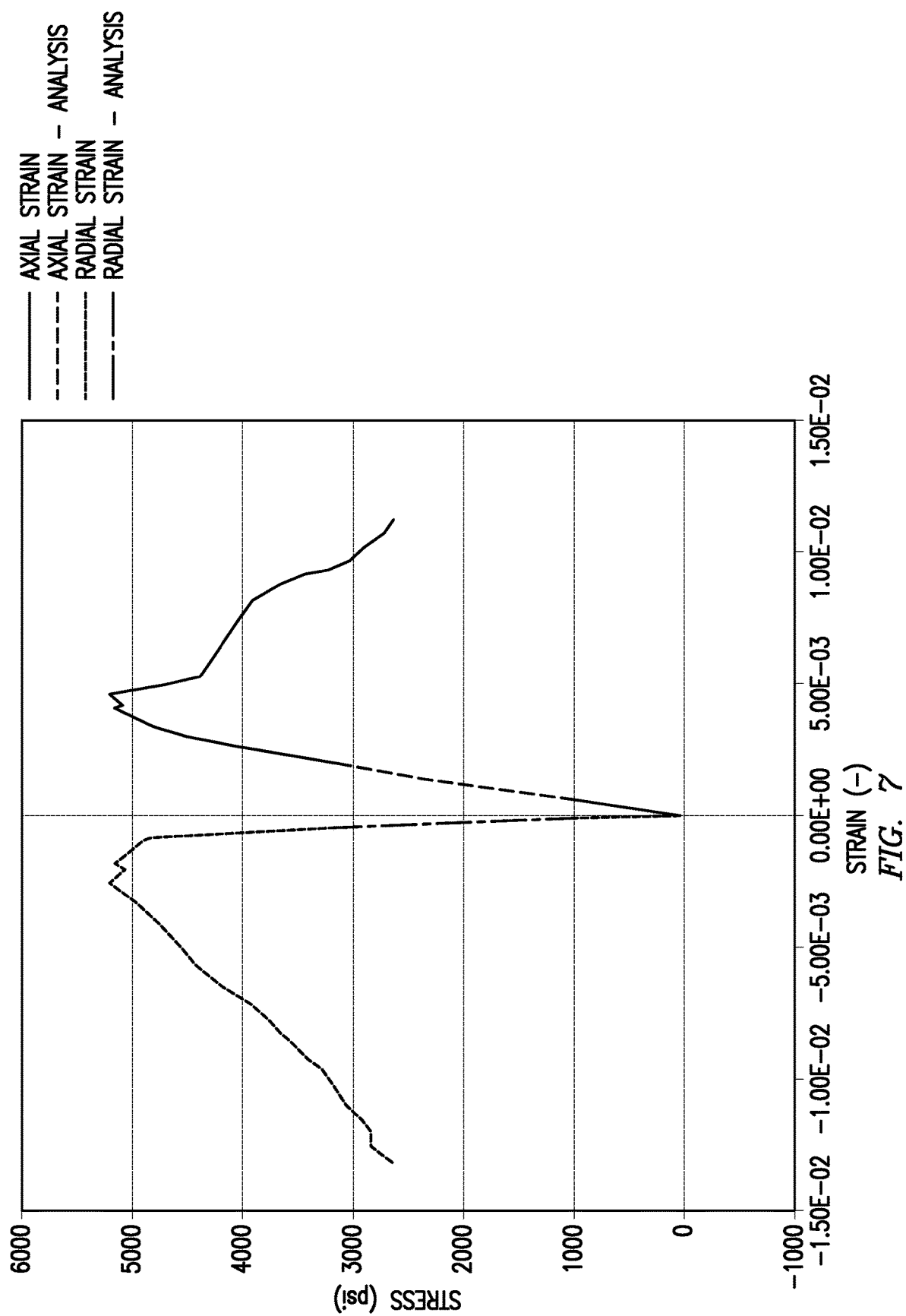
FIG. 7 is an axial and radial strain analysis of a hydraulic cement composition comprising styrene-butadiene latex (Slurry Design H).
Figure 8:
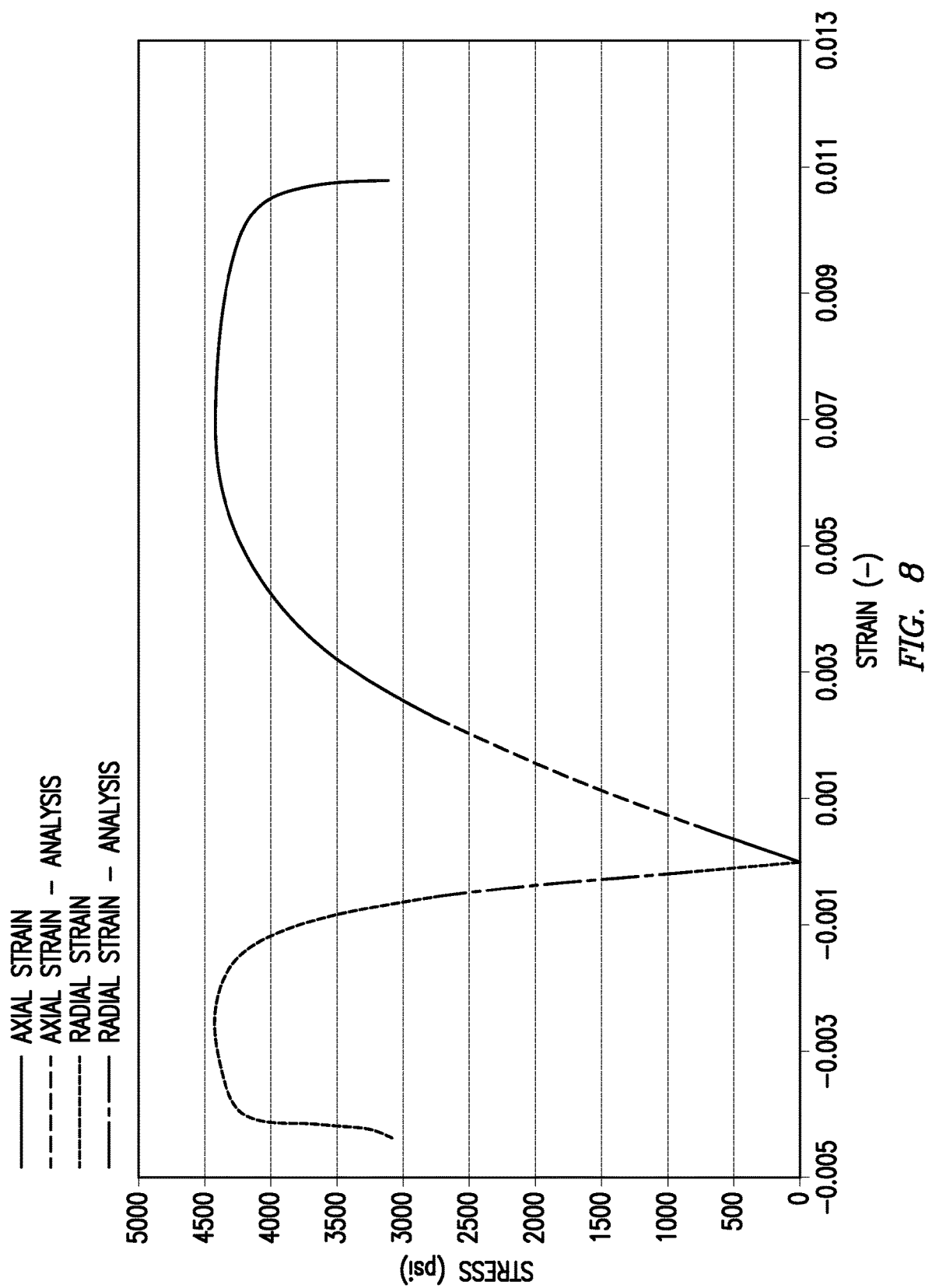
FIG. 8 is an axial and radial strain analysis of a hydraulic cement composition comprising SBDI latex (Slurry Design I).

The dimensions of the cured cement cylinders were 2 inches (5.1 cm) of diameter and 5 inches (12.7 cm) of length. The samples were crushed in a hydraulic press equipped with an extensometer. The results were analyzed to obtain Young's modulus (where 1 Mpsi equals 1 million psi), strain at failure, and compressive strength. The results are summarized in Table 6 (see FIGS. 7-8). These results show that the cement comprising SBDI latex exhibits better resiliency than that of styrene-butadiene latex.

TABLE 6

Young's modulus of samples

| Slurry Design | Young's Modulus | Strain at failure | Crush Strength |
|---|---|---|---|
| H | 1.63 Mpsi (11.2 × 10$^9$ Pa) | 0.0037 | 5,220 psi (36,000 kPa) |
| I | 1.14 Mpsi (7.86 × 10$^9$ Pa) | 0.0066 | 4,411 psi (30,400 kPa) |

Conclusion

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method of cementing in a well, the method comprising:
    (A) forming a hydraulic cement composition comprising:
        (i) a hydraulic cement;
        (ii) a polymer comprising at least one styrene monomer, at least one butyl acrylate monomer, at least one divinylbenzene monomer, and at least one 2-isopropenyl-2-oxazoline monomer; and
        (iii) water;
    (B) introducing the hydraulic cement composition into the well.

2. The method according to claim 1, wherein the molar proportions of the polymer are in the range of styrene monomer about 10% to about 35%, butyl acrylate monomer about 25% to about 60%, divinylbenzene monomer about 2% to about 15%, and 2-isopropenyl-2-oxazoline monomer about 10 to about 40%.

3. The method according to claim 1, wherein the polymer is in the form of a latex.

4. The method according to claim 1, wherein the hydraulic cement comprises a Portland cement.

5. The method according to claim 1, wherein the hydraulic cement composition includes water and is in the form of a slurry.

6. The method according to claim 1, wherein the hydraulic cement composition additionally comprises one or more additives selected from the group consisting of: a silica particulate, a retarder, a dispersant, an inorganic salt, a stabilizer, a defoamer, fly ash, and a weighting agent.

7. A method of cementing in a well, the method comprising:
    (A) forming a hydraulic cement composition comprising:
        (i) a hydraulic cement;
        (ii) a polymer comprising at least one monomer having an oxazoline group and at least one butyl acrylate monomer, wherein the polymer is in the form of a latex; and
        (iii) water;
    (B) introducing the hydraulic cement composition into the well.

8. The method according to claim 7, wherein the hydraulic cement comprises a Portland cement.

9. The method according to claim 7, wherein the hydraulic cement composition includes water and is in the form of a slurry.

10. The method according to claim 7, wherein the hydraulic cement composition additionally comprises one or more additives selected from the group consisting of: a silica particulate, a retarder, a dispersant, an inorganic salt, a stabilizer, a defoamer, fly ash, and a weighting agent.

11. A method of cementing in a well, the method comprising:
    (A) forming a hydraulic cement composition comprising:
        (i) a hydraulic cement;
        (ii) a polymer comprising molar proportions of one or more styrene monomers in the range of about 10% to about 35%, one or more butyl acrylate monomers in the range of about 25% to about 60%, one or more divinylbenzene monomers in the range of about 2% to about 15%, and one or more 2-isopropenyl-2-oxazoline monomers in the range of about 10% to about 40%; and
        (iii) water;
    (B) introducing the hydraulic cement composition in the well.

12. The method according to claim 11, wherein the polymer is in the form of a latex.

13. The method according to claim 11, wherein the hydraulic cement comprises a Portland cement.

14. The method according to claim 11, wherein the hydraulic cement composition includes water and is in the form of a slurry.

15. The method according to claim 11, wherein the hydraulic cement composition additionally comprises one or more additives selected from the group consisting of: a silica particulate, a retarder, a dispersant, an inorganic salt, a stabilizer, a defoamer, fly ash, and a weighting agent.

* * * * *